(12) United States Patent
Lee

(10) Patent No.: US 9,158,423 B2
(45) Date of Patent: Oct. 13, 2015

(54) METHOD OF DETECTING PRESENCE OF INTERFERENCE SOURCE, AND TOUCH SENSING SYSTEM

(71) Applicant: ENE Technology Inc., Hsin-Chu (TW)

(72) Inventor: Chao-Ming Lee, Hsin-Chu (TW)

(73) Assignee: ENE TECHNOLOGY INC., Hsin-Chu (TW)

( * ) Notice: Subject to any disclaimer, the term of this patent is extended or adjusted under 35 U.S.C. 154(b) by 110 days.

(21) Appl. No.: 14/042,141

(22) Filed: Sep. 30, 2013

(65) Prior Publication Data

US 2014/0306926 A1    Oct. 16, 2014

(30) Foreign Application Priority Data

Apr. 16, 2013 (TW) .............................. 102113452 A

(51) Int. Cl.
*G06F 3/044* (2006.01)

(52) U.S. Cl.
CPC ...................................... *G06F 3/044* (2013.01)

(58) Field of Classification Search
CPC ....................................................... G06F 3/044
USPC ....................................... 345/174; 178/18.05
See application file for complete search history.

(56) References Cited

U.S. PATENT DOCUMENTS

| 8,692,802 | B1* | 4/2014 | Maharyta et al. | 345/174 |
| 2011/0012863 | A1* | 1/2011 | Kobayashi et al. | 345/174 |
| 2011/0018558 | A1* | 1/2011 | Saito et al. | 324/676 |
| 2012/0223911 | A1* | 9/2012 | Westhues | 345/174 |
| 2012/0249460 | A1* | 10/2012 | Mizutani et al. | 345/173 |
| 2012/0256875 | A1* | 10/2012 | Ho et al. | 345/174 |
| 2012/0293447 | A1* | 11/2012 | Heng et al. | 345/174 |
| 2013/0127756 | A1* | 5/2013 | Wang et al. | 345/173 |
| 2013/0147756 | A1* | 6/2013 | Chan et al. | 345/174 |
| 2013/0169584 | A1* | 7/2013 | Konradi et al. | 345/174 |
| 2013/0271426 | A1* | 10/2013 | Yumoto et al. | 345/174 |
| 2013/0285974 | A1* | 10/2013 | Nakabayashi et al. | 345/174 |
| 2014/0074436 | A1* | 3/2014 | Voris et al. | 702/194 |

* cited by examiner

*Primary Examiner* — Kumar Patel
*Assistant Examiner* — Vinh Lam
(74) *Attorney, Agent, or Firm* — Christensen O'Connor Johnson Kindness PLLC

(57) ABSTRACT

A method for detecting presence of an interference source is to be performed by a touch sensing system that stores a threshold capacitance difference. The method includes the steps of sampling capacitances periodically within a time period for obtaining a base capacitance value; sensing a comparison capacitance after the time period; computing an absolute difference between the comparison capacitance and the base capacitance value; and determining that the interference source is present when the comparison capacitance is smaller than the base capacitance value and the absolute difference is greater than the threshold capacitance difference.

16 Claims, 8 Drawing Sheets

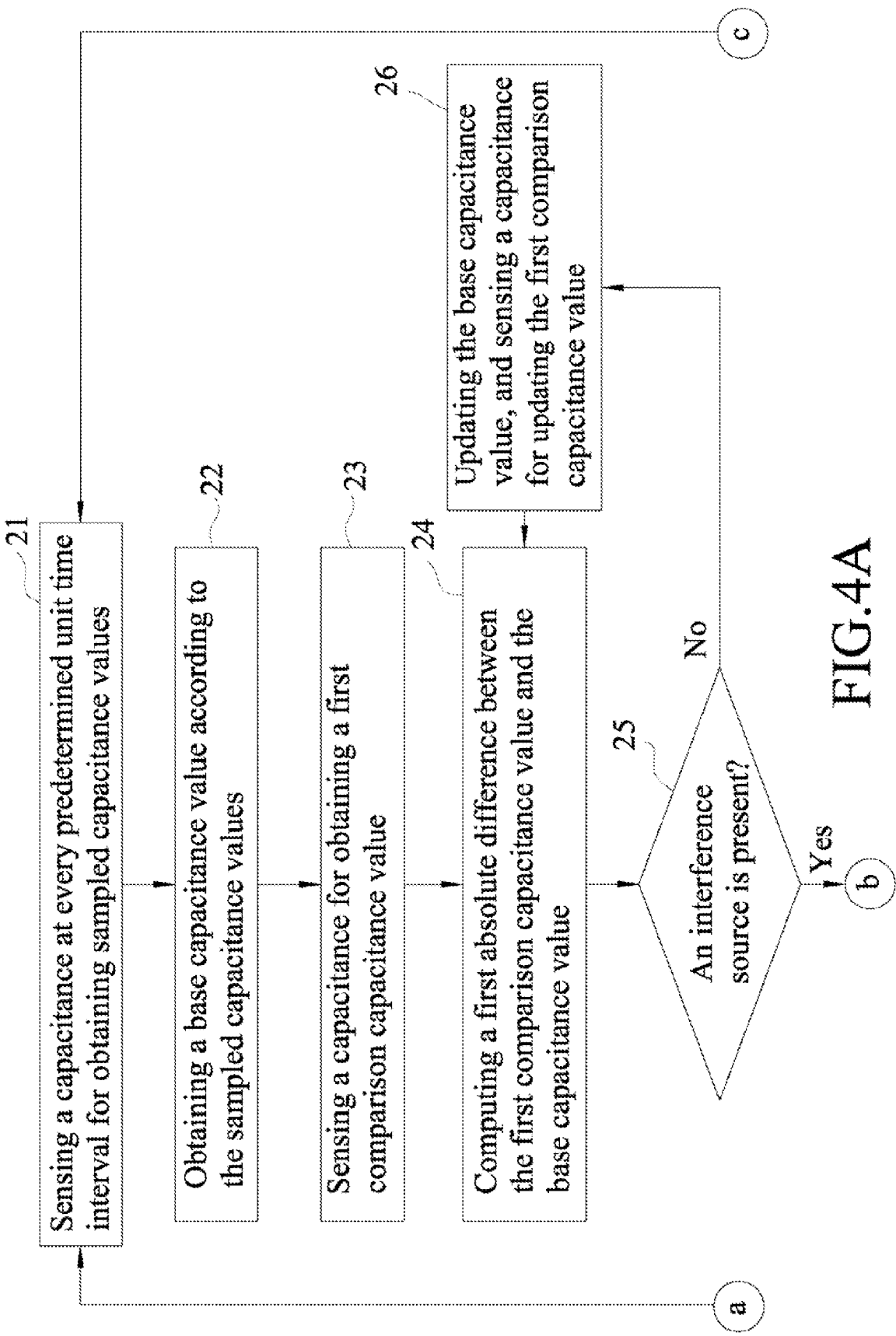

METHOD OF DETECTING PRESENCE OF INTERFERENCE SOURCE, AND TOUCH SENSING SYSTEM

CROSS-REFERENCE TO RELATED APPLICATION

This application claims priority to Taiwanese Application No. 102113452, filed on Apr. 16, 2013.

BACKGROUND OF THE INVENTION

1. Field of the Invention

The invention relates to a method for detecting presence of an interference source, and more particularly to a method for detecting presence of an interference source and performed by a touch sensing system.

2. Description of the Related Art

A conventional touch sensing device includes a touch sensor unit (e.g., a touch button), and a sensed signal processor operatively associated with the touch sensor unit for sensing external environment so as to generate a capacitance value. When the capacitance value thus generated exceeds a predetermined threshold value, the sensed signal processor generates a trigger signal for notification of a touch event.

The conventional touch sensing device is able to function normally when used in an environment that has certain temperature and humidity, and that is free of interference sources. However, in the presence of interference (e.g., electrostatic discharge or radiation noise from other electronic apparatuses), the capacitance value generated by the sensed signal processor may fluctuate drastically and undesirably exceed the predetermined threshold value. As a result, the sensed signal processor may generate the trigger signal without the touch sensor unit being actually triggered. Under severe circumstances, stability of electronic components to which the conventional touch sensing device outputs the trigger signal may be compromised.

In view of the above, several improvements have been proposed. One improvement involves increasing dimensions of a grounding copper foil of a substrate of the conventional touch sensing device to thereby facilitate grounding of radiation noise received by the conventional touch sensing device. Another improvement involves reducing gaps among components of the conventional touch sensing device to reduce propagation of radiation noise from interference sources through the conventional touch sensing device, thereby reducing interference of the radiation noise upon the conventional touch sensing device. Additionally, the components of the conventional touch sensing device may be made from materials that are resistant to radio-frequency (RF) radiation and static electricity.

However, although the abovementioned improvements are effective to a certain extent, they may suffer from other drawbacks. For example, the dimensions of the grounding copper foil may not be adjusted dynamically based on intensity and duration of interference detected by the conventional touch sensing device. Moreover, reducing the gaps among the components may result in a substantial change in appearance of the conventional touch sensing device, which may lead to compromised aesthetics. Furthermore, the abovementioned improvements may increase cost of manufacture.

SUMMARY OF THE INVENTION

Therefore, an object of the present invention is to provide a method for detecting presence of an interference source of a touch sensing system, so as to prevent misjudgments of touch events.

According to one aspect of the present invention, method for detecting presence of an interference source is to be performed by a touch sensing system that stores a threshold capacitance difference. The method comprises the steps of:

a) sensing a capacitance at every predetermined unit time interval within a predetermined time duration starting from a first time point and ending at a second time point for obtaining sampled capacitance values;

b) obtaining a base capacitance value according to the sampled capacitance values obtained in step a);

c) sensing a capacitance at a third time point after the second time point for obtaining a first comparison capacitance value;

d) computing a first absolute difference between the first comparison capacitance value obtained in step c) and the base capacitance value obtained in step b); and e) determining that the interference source is present when the first comparison capacitance value is smaller than the base capacitance value and the first absolute difference is greater than the threshold capacitance difference.

Another object of the present invention is to provide a touch sensing system that implements the method of this invention to prevent misjudgements of touch events.

According to another aspect of the present invention, a touch sensing system comprises:

a touch sensor unit;

a sensed signal processing unit that is coupled to the touch sensor unit, that controls the touch sensor unit to sense a capacitance at every predetermined unit time interval within a predetermined time duration starting from a first time point and ending at a second time point for obtaining sampled capacitance values, and to sense a capacitance at a third time point after the second time point for obtaining a comparison capacitance value, and that obtains a base capacitance value according to the sampled capacitance values; and a computing unit that is coupled to the sensed signal processing unit for receiving the base capacitance value and the comparison capacitance value therefrom, and that stores a threshold capacitance difference, the computing unit being operable to compute an absolute difference between the comparison capacitance value and the base capacitance value, and to determine that an interference source is present when the comparison capacitance value is smaller than the base capacitance value and the absolute difference is greater than the threshold capacitance difference.

BRIEF DESCRIPTION OF THE DRAWINGS

Other features and advantages of the present invention will become apparent in the following detailed description of the preferred embodiments with reference to the accompanying drawings, of which;

FIGS. 4(A) and 4(B) are flow charts illustrating a method for detecting presence of an interference source by the touch sensing system according to the present invention;

DETAILED DESCRIPTION OF THE PREFERRED EMBODIMENTS

Figure 1:
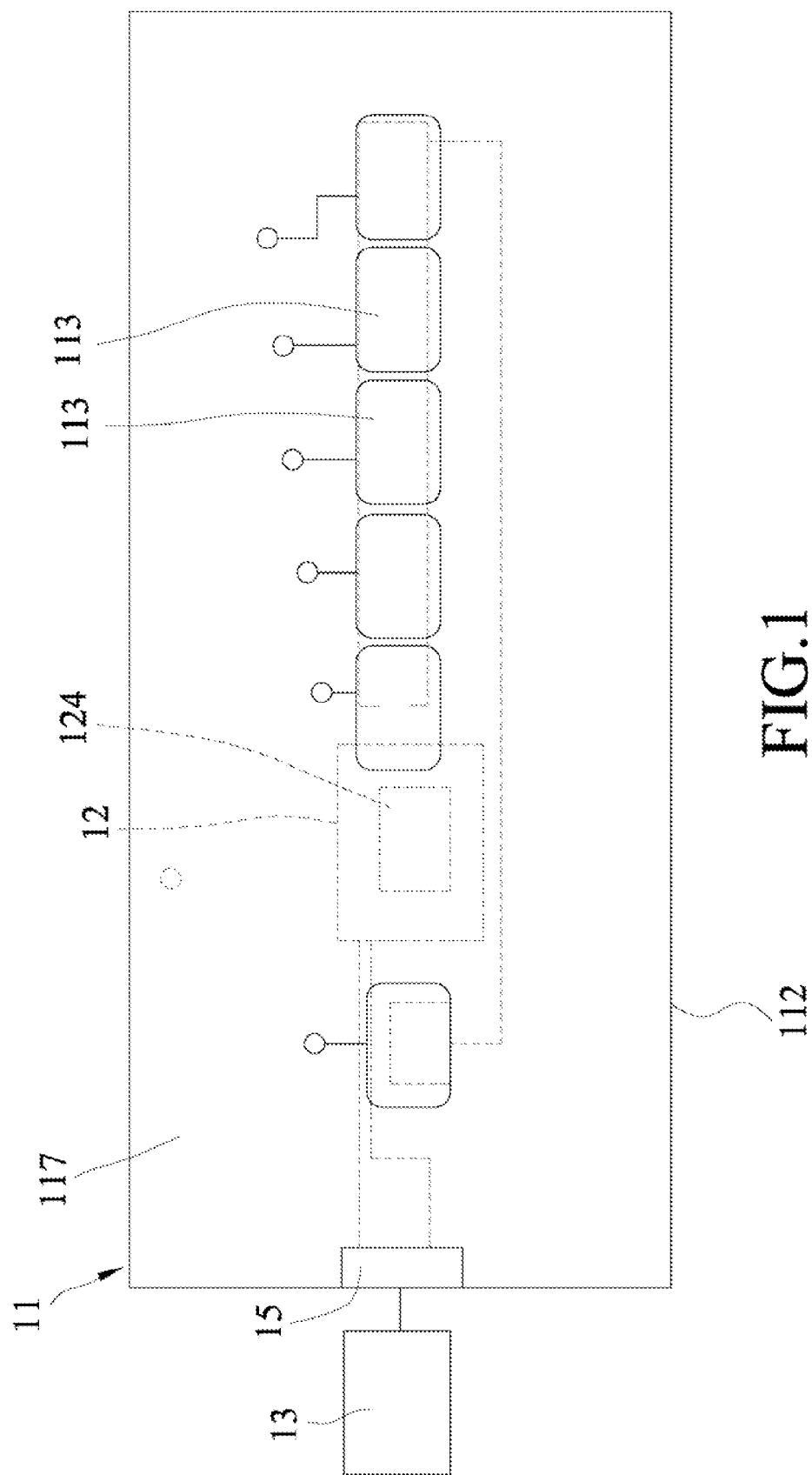
FIG. 1 is a schematic diagram showing a top view of a first preferred embodiment of a touch sensing system according to the present invention.
Figure 2:
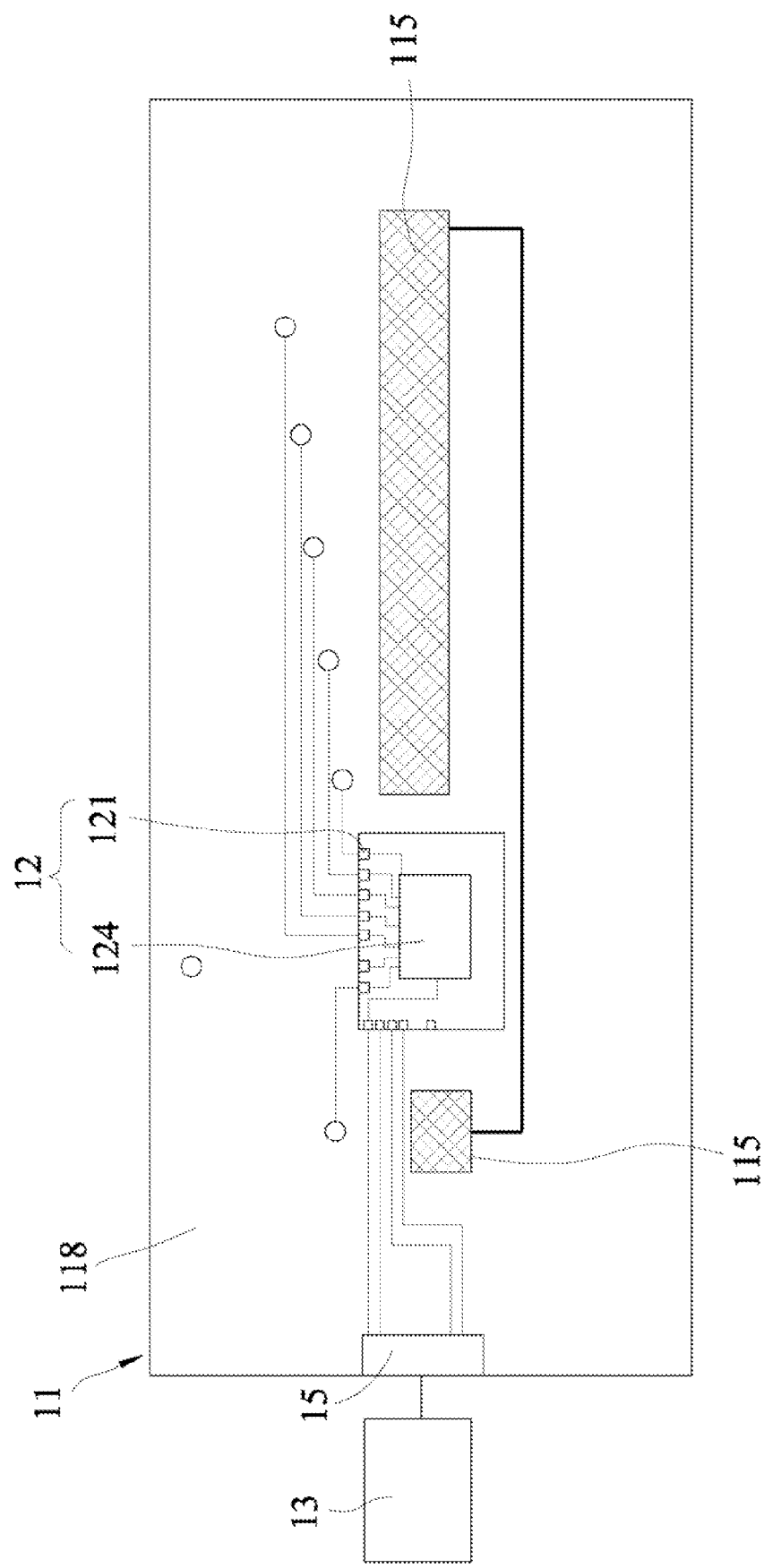
FIG. 2 is a schematic diagram showing a bottom view of the first preferred embodiment.
Figure 3:
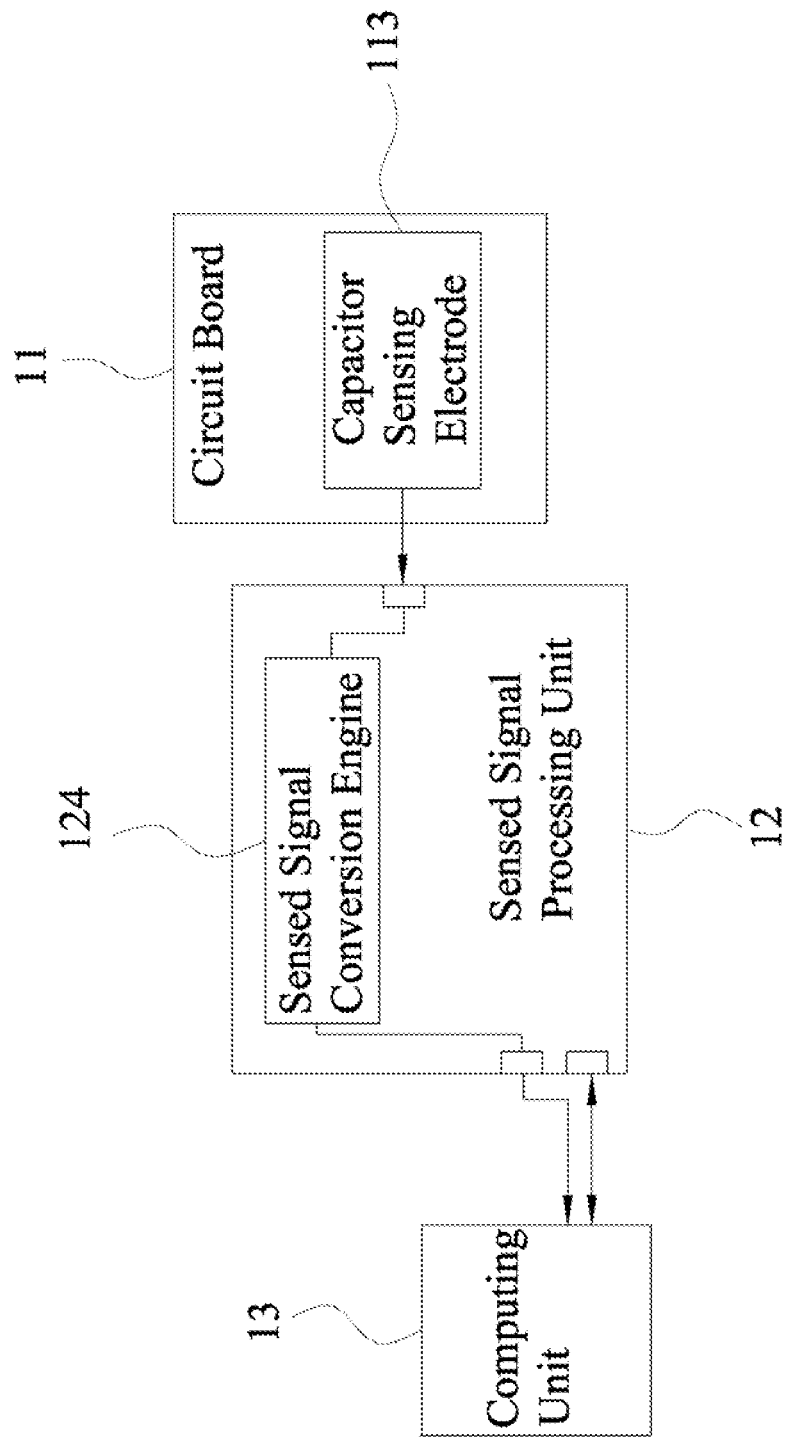
FIG. 3 is a block diagram of the first preferred embodiment.

Referring to FIGS. 1 to 3, the first preferred embodiment of the touch sensing system according to this invention is shown to comprise a touch sensing device that includes a circuit board 11 and a sensed signal processing unit 12 (which cooperates with the circuit board to form a touch control unit), and a computing unit 13 that is a component separate from the touch sensing device, that is coupled electrically to the sensed signal processing unit 12 and that stores a threshold capacitance difference. In other embodiments, the computing unit 13 may be integrated with the sensed signal processing unit 12.

The circuit board 11 includes a dielectric substrate 112, a plurality of capacitor sensing electrodes 113, and a grounding conductive layer 115. The dielectric substrate 112 has a first surface 117 having a first region, and a second surface 118 opposite to the first surface 117 and having a second region overlapping with a projection of the first region onto the second surface 113. Each capacitor sensing electrode 113 is formed on the first region of the first surface 117 of the dielectric substrate 112. The grounding conductive layer 115 is formed on the second region of the second surface 118 of the dielectric substrate 112. Each of the capacitor sensing electrodes 113 cooperates with the grounding conductive layer 115 to define a touch sensor unit. Accordingly, in this embodiment, the circuit board 11 is formed with a plurality of the touch sensor units. The circuit board 11 is substantially formed in a shape of a rectangle, but is not limited thereto. The circuit board 11 may be formed in the shape of a triangle, a circle, or a polygon depending on requirements. Preferably, the dielectric substrate 112 of the circuit board 11 has a thickness not smaller than 1 mm.

The sensed signal processing unit 12 is disposed on the second surface 118 of the dielectric substrate 112 where a projection thereof onto the first surface 117 of the dielectric substrate 112 is spaced apart from the capacitor sensing electrodes 113, and includes a plurality of capacitance sensing ports 121 coupled respectively to the capacitor sensing electrodes 113, and a sensed signal conversion engine 124 coupled to the capacitance sensing ports 121 for obtaining sensed capacitance variations from the capacitor sensing electrodes 113 and outputting a trigger signal accordingly.

The sensed signal processing unit 12 further includes a plurality of connection ports for transmitting and receiving electric power and electric signals, such as $V_{OD}$, GND, SDA, SCLD, etc. In the first preferred embodiment, the sensed signal processing unit 12 is a sensing chip.

In this embodiment, the computing unit 13 may be a single chip for controlling USB devices, solid state drives, or screen image scaling, etc., and delivering electric power and electric signals to the sensed signal processing unit 12 via a connector 15 on the circuit board 11, and for writing an initial value to the sensed signal processing unit 12.

When an object (e.g., a finger) touches any one of the capacitor sensing electrodes 113, the capacitance associated with the touched capacitor sensing electrode 113 is thus affected. Then, an electric touch sensed signal is generated at the touched capacitor sensing electrode 113 and is transmitted to the sensed signal conversion engine 124 through the corresponding capacitance sensing port 121. When the sensed signal conversion engine 124 detects the electric touch sensed signal and determines that an absolute difference between the magnitude of the electric touch sensed signal and a base value is greater than a predetermined threshold value, the sensed signal conversion engine 124 generates the trigger signal that indicates touching of the capacitor sensing electrode 113 to the computing unit 13.

Figure 4B:
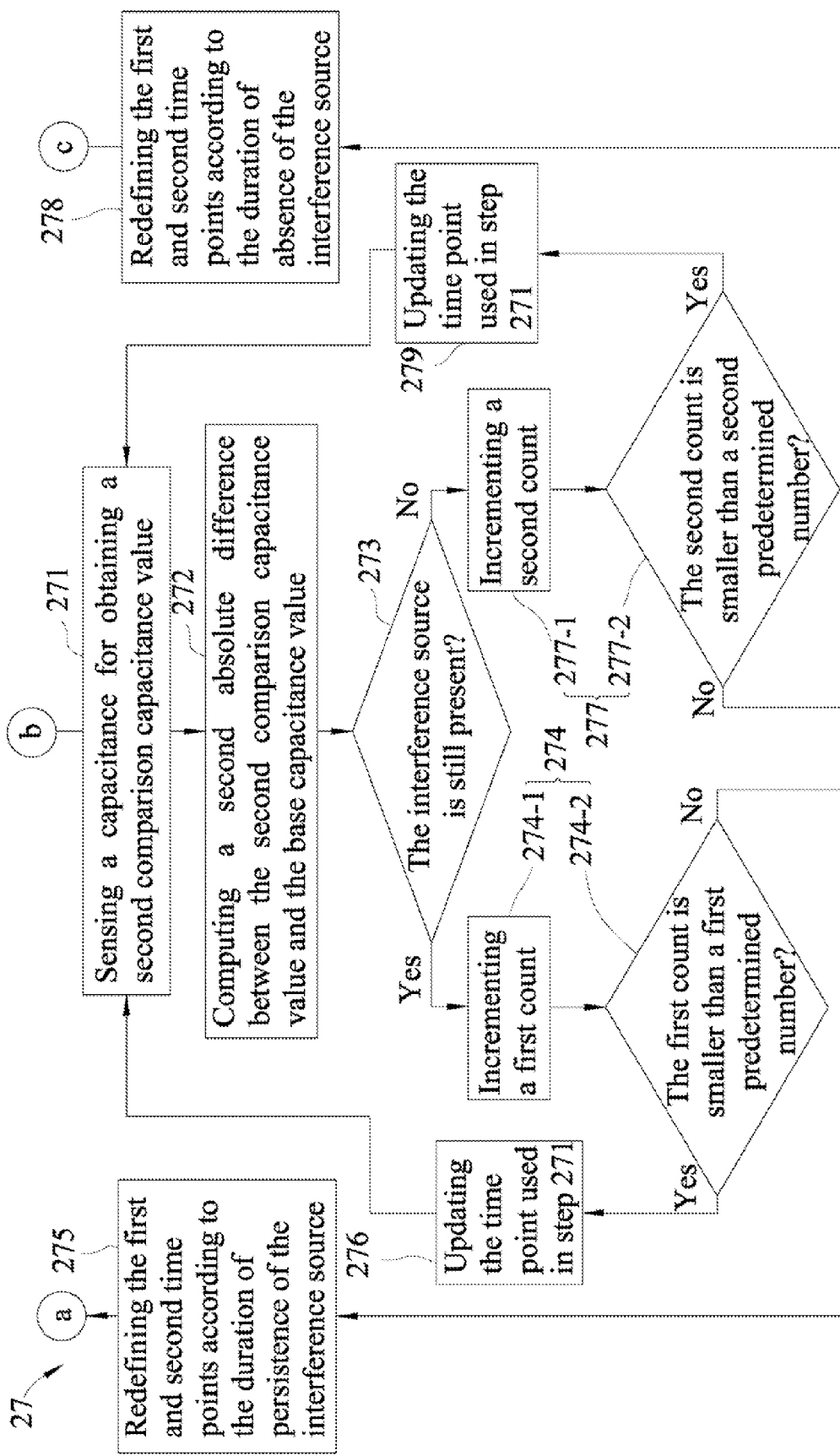

FIGS. 4A and 4B show flow charts illustrating steps of a method for detecting presence of an interference source performed by the touch sensing system according to the present invention, and only one of the touch sensor units will be illustrated herein for the sake of brevity.

In this embodiment, the threshold capacitance difference stored in the computing unit 13 is defined to be one half of the predetermined threshold value.

In step 21, the touch sensor unit is controlled by the sensed signal conversion engine 124 of the sensed signal processing unit 12 to sense a capacitance at every predetermined unit time interval within a predetermined time duration starting from a first time point and ending at a second time point for obtaining sampled capacitance values. In this embodiment, the predetermined unit time interval preferably ranges between 50 ns and 20 ms, and the predetermined time duration preferably ranges between 25 ms and 500 ms.

In step 22, the sensed signal conversion engine 124 of the sensed signal processing unit 12 obtains an average value of the sampled capacitance values obtained in step 21 to serve as the base capacitance value.

In step 23, the touch sensor unit is controlled by the sensed signal conversion engine 124 of the sensed signal processing unit 12 to sense a capacitance at a third time point after the second time point for obtaining a first comparison capacitance value. In this embodiment, a time interval between the second and third time points is the predetermined unit time interval.

In step 24, the computing unit 13 computes a first absolute difference between the first comparison capacitance value obtained in step 23 and the base capacitance value obtained in step 22.

In step 25, the computing unit 13 determines that the interference source is present when the first comparison capacitance value is smaller than the base capacitance value and the first absolute difference is greater than the threshold capacitance difference, and the flow goes to step 271. When the computing unit 13 determines that the interference source is not present, the flow goes to step 26. In step 26, the sensed signal conversion engine 124 of the sensed signal processing unit 12 obtains an updated value of the base capacitance value according to the capacitances sensed during a time period that has the predetermined time duration and that ends at the third time point, and the controls touch sensor unit to sense a capacitance at a time point after the third time point for obtaining an updated value of the first comparison capacitance value. In this embodiment, a time interval between the third time point and the time point which is for obtaining the updated value of the first comparison capacitance value is the predetermined unit time interval. Then, when steps 24 and 25 are repeated using the updated values of the base capacitance value and the first comparison capacitance value.

In step 271, the touch sensor unit is controlled by the sensed signal conversion engine 124 of the sensed signal processing unit 12 to sense a capacitance at a fourth time point following the third time point and temporally apart from the third time point by the predetermined unit time interval for obtaining a second comparison capacitance value.

In step 272, the computing unit 13 computes a second absolute difference between the second comparison capacitance value obtained in step 271 and the base capacitance value obtained in step 22.

In step 273, the computing unit 13 determines that the interference source is still present at the fourth time point when the second comparison capacitance value is smaller than the base capacitance value and the second absolute difference is greater than the threshold capacitance difference, and the flow goes to step 274.

In step 274, the computing unit 13 determines whether or not duration of persistence of the interference source is shorter than a first predetermined duration. The flow goes to step 275 when the duration of persistence of the interference source is not shorter than the first predetermined duration, and goes to step 276 when otherwise. In this embodiment, step 274 includes sub-steps 274-1 and 274-2. In sub-step 274-1, the computing unit 13 increments a first count. In step 274-2, the computing unit 13 determines whether or not the first count is smaller than a first predetermined number (e.g., 20). The duration of persistence of the interference source is defined as a product of the first count and the predetermined unit time interval, and the first predetermined duration is related to the first predetermined number and the predetermined unit time interval. The flow goes to step 275 when the first count is not smaller than the first predetermined number, and goes to step 276 when otherwise.

In step 275, the sensed signal conversion engine 124 of the sensed signal processing unit 12 redefines the first and second time points according to the duration of persistence of the interference source, and the flow goes back to step 21. In this embodiment, the first time point is redefined to be a time point that follows the first time point in step 21 and that is temporally apart from the first time point in step 21 by at most the duration of persistence of the interference source (i.e., the product of the first count and the predetermined unit time interval), and the second time point is redefined to be a time point that follows the second time point in step 21 and that is temporally apart from the second time point in step 21 by at most the duration of persistence of the interference source.

In step 276, the sensed signal conversion engine 124 of the sensed signal processing unit 12 updates the fourth time point using a time point that follows the fourth time point in step 271 and that is temporally apart from the fourth time point by the predetermined unit time interval, and the flow goes back to step 271, When the interference source is determined to be no longer present at the fourth time point in step 273, the flow goes to step 277. In step 277, the computing unit 13 determines whether or not duration of absence of the interference source is shorter than a second predetermined duration. The flow goes to step 278 when the duration of absence of the interference source is not shorter than the second predetermined duration, and goes to step 279 when otherwise. In this embodiment, step 277 includes sub-steps 277-1 and 277-2. In sub-step 277-1, the computing unit 13 increments a second count. In step 277-2, the computing unit 13 determines whether or not the second count is smaller than a second predetermined number (e.g., 20). The duration of absence of the interference source is defined as a product of the second count and the predetermined unit time interval, and the second predetermined duration is related to the second predetermined number and the predetermined unit time interval. The flow goes to step 278 when the second count is not smaller than the second predetermined number, and goes to step 279 when otherwise.

In step 278, the sensed signal conversion engine 124 of the sensed signal processing unit 12 redefines the first and second time points according to the duration of absence of the interference source, and the flow goes back to step 21. In this embodiment, the first time point is redefined to be a time point that follows the first time point in step 21 and that is temporally apart from the first time point in step 21 by at most the duration of absence of the interference source (i.e., the product of the second count and the predetermined unit time interval), and the second time point is redefined to be a time point that follows the second time point in step 21 and that is temporally apart from the second time point in step 21 by at most the duration of absence of the interference source.

In step 279, the sensed signal conversion engine 124 of the sensed signal processing unit 12 updates the fourth time point using a time point that follows the fourth time point in step 271 and that is temporally apart from the fourth time point by the predetermined unit time interval, and the flow goes back to step 271, When the interference source results from electrostatic discharge, external radio-frequency signal noise, or sudden change of either one of the environmental temperature and humidity, capacitances sensed by the touch sensor unit may fluctuate drastically around the base capacitance value (i.e., average of the sampled capacitance values), so that some of the sensed capacitances may be much lower than the base capacitance value, while the sensed capacitances are definitely greater than the base capacitance value by at least the threshold capacitance difference when the touch event is normally triggered by a target object.

Accordingly, steps 21 to 26 of the method according to the present invention may be used to detect presence of the interference source through comparison of the first comparison capacitance value and the base capacitance value, and comparison of the first absolute difference and the threshold capacitance difference. When the interference source is determined to be not present in step 25, the flow goes to step 26 and then back to step 24 to repeat sensing capacitances and updating the base capacitance value. On the other hand, when the interference source is determined to be present in step 25, the sensed signal conversion engine 124 of the sensed signal processing unit 12 stops updating the base capacitance value.

Another kind of interference source may be an object that contacts the touch sensor unit from a time point before the method of this invention is performed. For example, there may be a finger on the touch sensor unit of the touch sensing device before activation of the touch sensing system, and the touch sensing system is turned on to perform the method with the finger still on the touch sensor unit, thereby obtaining an abnormal base capacitance value, which will be much greater than a normal base capacitance value. When the finger is subsequently removed from the touch sensor unit, the capacitances sensed by the touch sensor unit are continuously much lower than the abnormal base capacitance value. In such a case, the computing unit 13 increments the first count during each repetition of sub-step 274-1, and the flow goes to step 275 and back to step 21 for updating the base capacitance value under a normal condition when the first count is determined to be not smaller than the first predetermined number in sub-step 274-2.

In addition, when, the interference source resulting from the electrostatic discharge, external radio-frequency signal noise, or sudden change of either one of the environmental temperature and humidity is no longer present, the computing unit 13 increments the second count during each repetition of sub-step 277-1, and the flow goes to step 278 and back to step 21 for updating the base capacitance value under a normal condition when the second count is determined to be not smaller than the second predetermined number in sub-step 277-2.

Through designs of the first count and the second count, the touch sensing system may distinguish among different kinds of the interference sources, and update the base capacitance accordingly.

It should be rioted that, in other embodiments of this invention, the circuit board 11 may include only one capacitor sensing electrode 113, and the sensed signal processing unit 12 may include only one capacitance sensing port 121 corresponding to the capacitor sensing electrode 113. Capacitance variation sensed by the capacitor sensing electrode 113 may be transmitted to the sensed signal conversion engine 124 through the capacitance sensing port 121.

Figure 5:
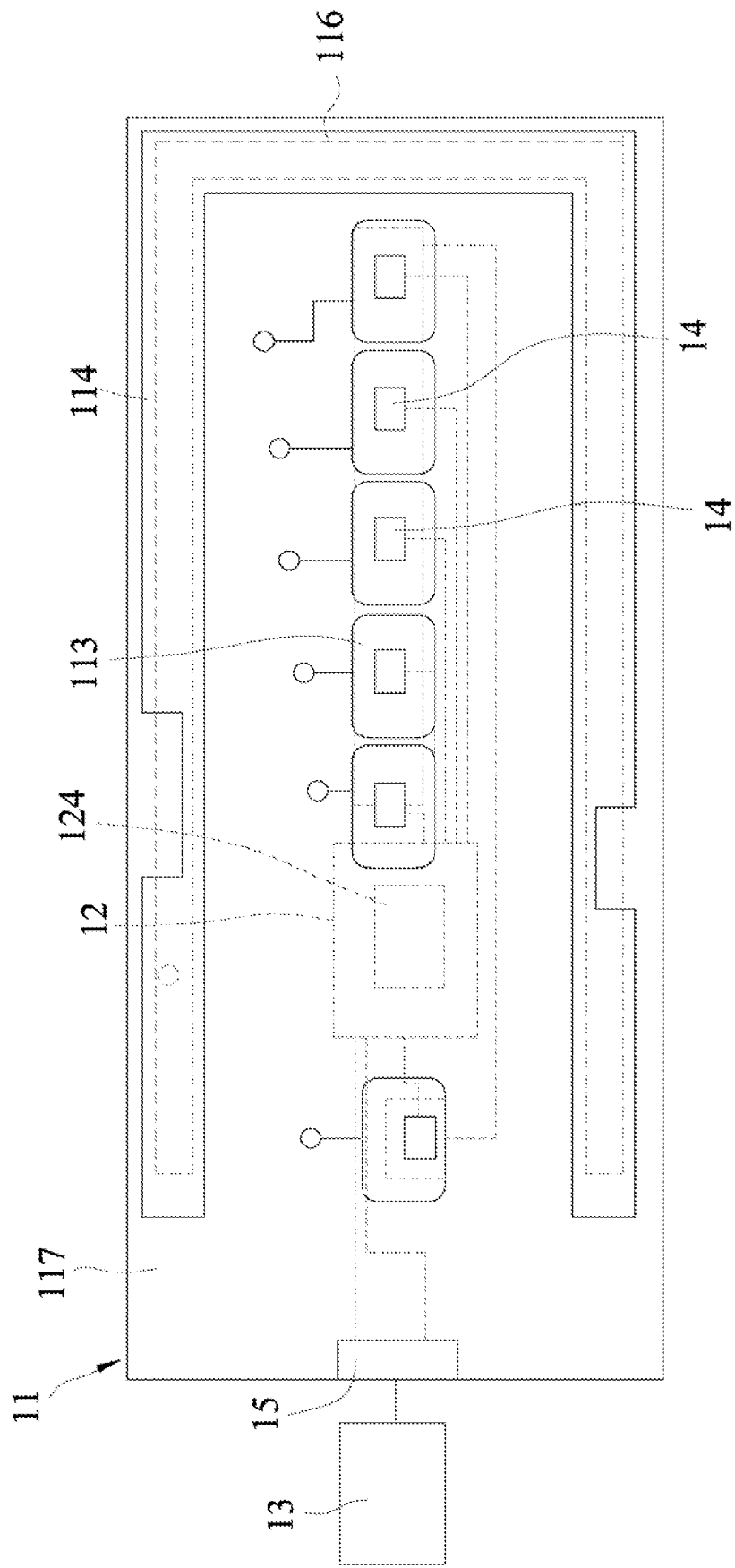
FIG. 5 is a schematic diagram showing a top view of a second preferred embodiment of a touch sensing system according to the present invention.
Figure 6:
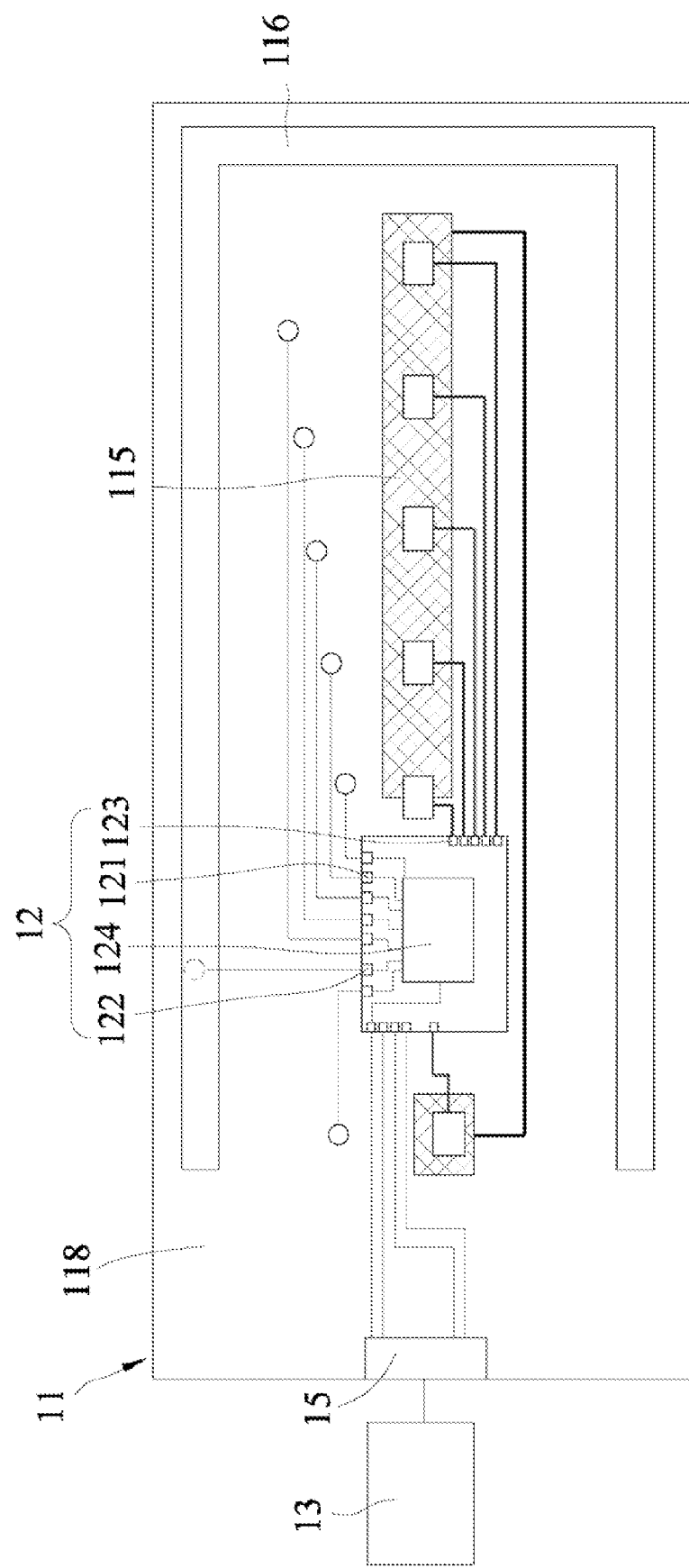
FIG. 6 is a schematic diagram showing a bottom view of the second preferred embodiment.
Figure 7:
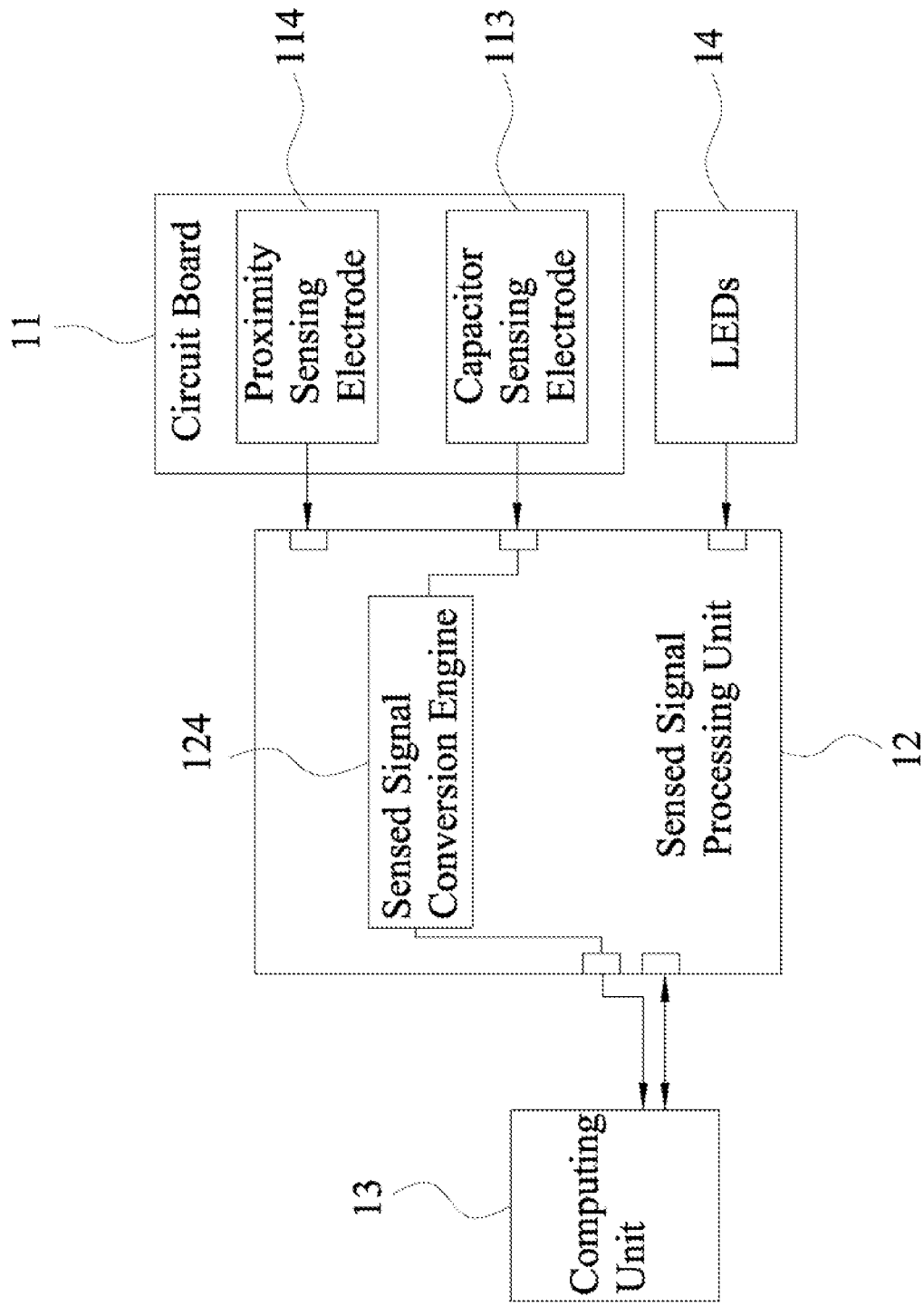
FIG. 7 is a block diagram of the second preferred embodiment.

Referring to FIGS. 5 to 7, the second preferred embodiment of the touch sensing system according to the present invention is shown to be similar to the first preferred embodiment, and differs in that the second preferred embodiment further includes a plurality of light emitting diodes (LEDs) 14 disposed on the circuit board 11. Each of the capacitor sensing electrodes 113 corresponds to at least one LED 14. The sensed signal processing unit 12 further includes a plurality of light control ports 123 coupled respectively to the LEDs 14, and controls light emission of the LEDs 14 according to capacitance variation sensed by the touch sensor units.

The first surface 117 of the dielectric substrate 112 further has a third region spaced apart from the first region, and the second surface 118 of the dielectric substrate 112 further has a fourth region spaced apart from the second region and overlapping with a projection of the third region onto the second surface 118. The circuit board 11 further includes a proximity sensing electrode 114 formed on the third region of the first surface 117, and an auxiliary proximity sensing electrode 116 formed on the fourth region of the second surface 118 and coupled electrically to the proximity sensing electrode 114.

The computing unit 13 transmits electric power and electric signals to the sensed signal processing unit 12 through the connector 15, and writes an initial value to the sensed signal processing unit 12. When an object (e.g., a finger or a conductor rod) is located in the sensing range of the proximity sensing electrode 114, the electric field lines above the proximity sensing electrode 114 are thus affected. An electric non-touch sensed signal is then generated at the proximity sensing electrode 114 and is transmitted to the sensed signal conversion engine 124 via a port 122 of the sensed signal processing unit 12. When the sensed signal conversion engine 124 detects the electric non-touch sensed signal and determines the magnitude of the electric non-touch sensed signal to be greater than a threshold value, the sensed signal conversion engine 124 generates an output signal to indicate that the proximity sensing electrode 114 has sensed something to the computing unit 13. After the computing unit 13 receives the output signal from the sensed signal conversion engine 124, the computing unit 13 provides a signal associated with execution process of driving the LEDs 14 to the sensed signal processing unit 12 through the connector 15 for driving the LEDs 14.

In the second preferred embodiment, the LEDs 14 of the touch sensing device may emit light not only because the touch sensor unit is touched, but also because an object approaches the proximity sensing electrode 114 or the auxiliary proximity sensing electrode 116.

Furthermore, the first and second preferred embodiments may include a cover plate (not shown) covering the circuit board 11, and adhesive. The cover plate is made of insulator material, such as glass or plastic, and is connected to the circuit board 11 by the adhesive, which is insulator adhesive, such as double-sided adhesive tape.

For describing operation of the present invention, an implementation of the second preferred embodiment is illustrated hereinafter.

The circuit board is a double layer printed circuit board, which is substantially formed in the shape of a rectangle. The circuit board has a dielectric substrate with a length of 130 mm, a width of 12 mm, and a thickness of 1.6 mm. The dielectric substrate has opposite first and second surfaces. The first surface has a first region and a third region spaced apart from the first region, and the second surface has a second region and a fourth region spaced apart from the third region. The second region overlaps with a projection of the first region onto the second surface, and the fourth region overlaps with a projection of the third region onto the second surface.

There are six capacitor sensing electrodes formed on the first region and a proximity sensing electrode formed on the third region. The proximity sensing electrode has a width of 1.5 mm, and is formed of a U shape. The sensing range of the proximity sensing electrode is from 1 cm to 10 cm according to size of the object to be sensed.

The grounding conductor foil and the auxiliary proximity sensing electrode are formed respectively on the second and fourth regions of the second surface of the dielectric substrate.

This implementation includes six LEDs having the same wavelength range, and one LED having a wavelength range different from other LEDs. The LEDs are respectively disposed at positions corresponding to the capacitor sensing electrodes, and each of the LEDs has a light exiting surface facing in a same direction as the first surface of the dielectric substrate. In this implementation, the six LEDs having the same wavelength range correspond respectively to the six capacitor sensing electrodes, and the other LED with the different wavelength range corresponds to one of the six capacitor sensing electrodes, which is spaced apart from the other capacitor sensing electrodes. That is, the capacitor sensing electrode that is spaced apart from the other capacitor sensing electrodes has two LEDs corresponding thereto.

There is a connector that includes an I$^2$C bus and that is disposed adjacent to an edge of the circuit board.

There is a sensed signal processing unit, which is a button signal processing chip (Model no. SB3584, designed by ENETECHNOLOGY) and includes 25 ports. The button signal processing chip is integrated with a buffer for storing electric signals and function settings of general purpose inputs/outputs (GPIO). The button signal processing chip includes 13 sensing ports, 11 connection ports, and an interrupt port. The interrupt port transmits electric signals to a computing unit through the I$^2$C bus. The sensing ports are respectively coupled to the proximity sensing electrode (proximity sensing port), the six capacitor sensing electrodes (capacitance sensing ports), and the LEDs (light control ports). Some of the remaining ports are coupled to resistors and capacitors for adjustment of sensing sensitivity, and some of the remaining ports are coupled to the signal connector and the I$^2$C bus for transmitting and receiving electric power, ground level, and signals from the computing unit.

When the sensing ports detect a signal indicating a sensing event, the interrupt port is switched from a high voltage level to a low voltage level to inform the computing unit of the sensing event. The computing unit knows which electrode is triggered by reading the buffer of the sensing chip, and executes the associated process.

The computing unit is embedded with a microcontroller, is coupled to the sensed signal processing unit, stores a threshold capacitance difference therein, and transmits electric power and signals to the sensed signal processing unit. Specifically, the computing unit is written with a firmware program for detecting an interference source resulting from a radio-frequency signal or an object contacting the touch sensing device.

When the computing unit is activated, electric power is transmitted to the button signal processing chip through the $I^2C$ bus, and initial values of the activated computing unit are written into the buffer of the button signal processing chip through the $I^2C$ bus, so as to activate sensing by the capacitor sensing electrodes and the proximity sensing electrode, and to complete parameter settings of GPIO to drive the LEDs upon receipt of electric signals.

When an object is located in a sensing range of the proximity sensing electrode and the auxiliary proximity sensing electrode, the sensed signal conversion engine of the button signal processing chip sends an interrupt (INT) signal to the external circuit. When the external circuit is informed that a proximity sensing is triggered, the computing unit generates commands associated with execution process for simultaneously driving the LEDs, and sends the commands to the buffer of the button signal processing chip through the $I^2C$ bus. Then, the LEDs are simultaneously driven to emit light according to the program stored in the buffer. When the object is removed from the sensing range of the proximity sensing electrode and the auxiliary proximity sensing electrode, the LEDs are turned off.

When the object touches one of the capacitor sensing electrodes, the sensed signal conversion engine of the button signal processing chip sends an INT signal to the computing unit. In addition to clearing the pending flag of the button signal processing chip via the $I^2C$ bus for converting voltage level of the interrupt port from low to high, the computing unit reads an electric signal indicating a state of "the capacitor sensing electrode has been touched" in the button status register of the button signal processing chip, so as to be aware of which capacitor sensing electrode has been touched. Then, a command associated with execution process for driving a single LED is generated and sent to the buffer of the button signal processing chip. The LED corresponding to the touched capacitor sensing electrode is thus driven to emit light according to the program stored in the buffer.

In this implementation, the sensed signal processing unit controls the touch sensor unit to sense a capacitance every 166 ns within 20 ms starting from a first time point and ending at a second time point for obtaining sampled capacitance values, obtains an average value of the sampled capacitance values to serve as a base capacitance value, and controls the touch sensor unit to sense a capacitance at a third time point after the second time point by 166 ns for obtaining a first comparison capacitance value.

The computing unit periodically computes a first absolute difference between the first comparison capacitance value and the base capacitance value through the firmware program with a predetermined time period not smaller than 166 ns. In this implementation, the predetermined time period is 20 ms. Then, the computing unit determines that the interference source is present when the first comparison capacitance value is smaller than the base capacitance value and the first absolute difference is greater than the threshold capacitance difference.

When the interference source is determined to be present, the sensed signal processing unit controls the touch sensor unit to sense a capacitance at a fourth time point following the third time point and temporally apart from the third time point by 166 ns for obtaining a second comparison capacitance value, and the computing unit computes a second absolute difference between the second comparison capacitance value and the base capacitance value. The computing unit determines that the interference source is still present at the fourth time point and increments a first count when the second comparison capacitance value is smaller than the base capacitance value and the second absolute difference is greater than the threshold capacitance difference. When the first count is not smaller than 20 (first predetermined number), this means that persistence of the interference is longer than 300 ms (20 ms×20=400 ms), and the interference source may be a result of removal of an object that originally touched the touch sensor unit. Therefore, the touch sensing system proceeds to update the base capacitance value.

When the interference source is first determined to be present but subsequent repetitions of sensing actions indicate that the interference source is no longer present, the computing unit increments a second count. When the second count is not smaller than 20 (second predetermined number), this means that the interference source may be a result of radiation noise or electrostatic discharge, which has disappeared, and the touch sensor unit thus can sense capacitance without such interference. Therefore, the touch sensing system proceeds to update the base capacitance value.

On the other hand, when the first count or the second count is smaller than 20, this means that the sensing environment is still unstable, and may still be in a state of being affected by external interference. Therefore, the sensing action must be repeated without updating the base capacitance value.

To sum up, the method for detecting presence of an interference source according to the present invention is performed by a touch sensing system. When the interference source results from the electrostatic discharge or radiation noise, the base capacitance value is to be updated so that misjudgment of a touch event may be prevented. When the interference source is due to removal of an object originally touching the touch sensing device, the base capacitance value is to be updated for recovering normal trigger operation, and abnormal operation may thus be prevented (e.g., unable to trigger a touch event).

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for detecting presence of an interference source to be performed by a touch sensing system that stores a threshold capacitance difference, said method comprising the steps of:
   a) sensing a capacitance at every predetermined unit time interval within a predetermined time duration starting from a first time point and ending at a second time point for obtaining sampled capacitance values;
   b) obtaining a base capacitance value according to the sampled capacitance values obtained in step a);
   c) sensing a capacitance at a third time point after the second time point for obtaining a first comparison capacitance value;
   d) computing a first absolute difference between the first comparison capacitance value obtained in step c) and the base capacitance value obtained in step b); and
   e) determining that the interference source is present when the first comparison capacitance value is smaller than the base capacitance value and the first absolute difference is greater than the threshold capacitance difference;

said method further comprising:
when the interference source is determined to be not present in step e),
obtaining an updated value of the base capacitance value according to the capacitances sensed during a time period that has the predetermined time duration and that ends at the third time point, and
sensing a capacitance at a fourth time point after the third time point for obtaining an updated value of the first comparison capacitance value; and
repeating steps d) and e) using the updated values of the base capacitance value and the first comparison capacitance value.

2. The method as claimed in claim 1, wherein steps a), b) and c) are performed by a touch control unit of the touch sensing system, and steps d) and e) are performed by a computing unit of the touch sensing system, the computing unit being a component that is separate from the touch control unit, that is coupled electrically to the touch control unit, and that stores the threshold capacitance difference.

3. The method as claimed in claim 1, wherein the base capacitance value obtained in step b) is an average value of the sampled capacitance values obtained in step a).

4. The method as claimed in claim 1, wherein the predetermined unit time interval ranges between 50 ns and 20 ms.

5. A method for detecting presence of an interference source to be performed by a touch sensing system that stores a threshold capacitance difference, said method comprising the steps of:
a) sensing a capacitance at every predetermined unit time interval within a predetermined time duration starting from a first time point and ending at a second time point for obtaining sampled capacitance values;
b) obtaining a base capacitance value according to the sampled capacitance values obtained in step a);
c) sensing a capacitance at a third time point after the second time point for obtaining a first comparison capacitance value, a time interval between the second and third time points being the predetermined unit time interval;
d) computing a first absolute difference between the first comparison capacitance value obtained in step c) and the base capacitance value obtained in step b); and
e) determining that the interference source is present when the first comparison capacitance value is smaller than the base capacitance value and the first absolute difference is greater than the threshold capacitance difference;
said method further comprising, when the interference source is determined to be present in step e), the steps of:
i) sensing a capacitance at a fourth time point following the third time point and temporally apart from the third time point by the predetermined unit time interval for obtaining a second comparison capacitance value;
ii) computing a second absolute difference between the second comparison capacitance value obtained in step i) and the base capacitance value obtained in step b);
iii) determining that the interference source is still present at the fourth time point when the second comparison capacitance value is smaller than the base capacitance value and the second absolute difference is greater than the threshold capacitance difference;
iv) when the interference source is determined to be still present in step iii), and duration of persistence of the interference source is not shorter than a first predetermined duration, proceeding back to step a) with the first and second time points redefined according to the duration of persistence of the interference source; and
v) when the interference source is determined to be still present in step iii), and the duration of persistence of the interference source is shorter than the first predetermined duration, proceeding back to step i) using a time point that follows the fourth time point and that is temporally apart from the fourth time point by the predetermined unit time interval as an updated fourth time point.

6. The method as claimed in claim 5, further comprising, when the interference source is determined to be present in step e), the steps of:
vi) when the interference source is determined to be no longer present in step iii), and duration of absence of the interference source is not shorter than a second predetermined duration, proceeding back to step a) with the first and second time points redefined according to the duration of absence of the interference source; and
vii) when the interference source is determined to be no longer present in step iii), and the duration of absence of the interference source is shorter than the second predetermined duration, proceeding back to step i) using a time point that follows the fourth time point and that is temporally apart from the fourth time point by the predetermined unit time interval as an updated fourth time point.

7. The method as claimed in claim 6, further comprising:
when the interference source is determined to be still present in step iii), the step of incrementing a first count; and
when the interference source is determined to be no longer present in step iii), the step of incrementing a second count;
wherein, in steps iv) and v), whether or not the duration of persistence of the interference source is shorter than the first predetermined duration is determined by determining whether or not the first count is smaller than a first predetermined number, the duration of persistence of the interference source being related to the first count and the predetermined unit time interval; and
wherein, in steps vi) and vii), whether or not the duration of absence of the interference source is shorter than the second predetermined duration is determined by determining whether or not the second count is smaller than a second predetermined number, the duration of absence of the interference source being related to the second count and the predetermined unit time interval.

8. The method as claimed in claim 7, wherein the predetermined unit time interval ranges between 50 ns and 20 ms.

9. The method as claimed in claim 7, wherein, in step iv), the first time point is redefined to be a time point that follows the first time point in step a) and that is temporally apart from the first time point in step a) by at most the duration of persistence of the interference source, the second time point being redefined to be a time point that follows the second time point in step a) and that is temporally apart from the second time point in step a) by at most the duration of persistence of the interference source, the duration of persistence of the interference source being defined as a product of the first count and the predetermined unit time interval; and
wherein, in step vi), the first time point is redefined to be a time point that follows the first time point in step a) and that is temporally apart from the first time point in step a) by at most the duration of absence of the interference source, the second time point being redefined to be a time point that follows the second time point in step a) and that is temporally apart from the second time point in step a) by at most the duration of absence of the interference source, the duration of absence of the interference source being defined as a product of the second count and the predetermined unit time interval.

10. A touch sensing system comprising:

a touch sensor unit;

a sensed signal processing unit that is coupled to said touch sensor unit, that controls said touch sensor unit to sense a capacitance at every predetermined unit time interval within a predetermined time duration starting from a first time point and ending at a second time point for obtaining sampled capacitance values, and to sense a capacitance at a third time point after the second time point for obtaining a comparison capacitance value, and that obtains a base capacitance value according to the sampled capacitance values; and a computing unit that is coupled to said sensed signal processing unit for receiving the base capacitance value and the comparison capacitance value therefrom, and that stores a threshold capacitance difference, said computing unit being operable to compute an absolute difference between the comparison capacitance value and the base capacitance value, and to determine that an interference source is present when the comparison capacitance value is smaller than the base capacitance value and the absolute difference is greater than the threshold capacitance difference;

wherein, when said computing unit determines that the interference source is not present, said sensed signal processing unit obtains an updated value of the base capacitance value according to the capacitances sensed during a time period that has the predetermined time duration and that ends at the third time point, and controls said touch sensor unit to sense a capacitance at a fourth time point after the third time point for obtaining an updated value of the comparison capacitance value.

11. The touch sensing system as claimed in claim 10, wherein said sensed signal processing unit is configured to obtain an average value of the sampled capacitance values to serve as the base capacitance value.

12. The touch sensing system as claimed in claim 10, wherein a time interval between the second and third time points is the predetermined unit time interval.

13. The touch sensing system as claimed in claim 10, wherein the predetermined unit time interval ranges between 50 ns and 20 ms.

14. The touch sensing system as claimed in claim 10, further comprising a circuit board including a dielectric substrate that has a first surface having a first region, and a second surface opposite to said first surface and having a second region overlapping with a projection of said first region onto said second surface, said circuit board further including at least one capacitor sensing electrode formed on said first region of said first surface thereof, and a grounding conductive layer formed on said second region of said second surface thereof, said capacitor sensing electrode cooperating with said grounding conductive layer to define said touch sensor unit.

15. The touch sensing system as claimed in claim 14, wherein said first surface of said dielectric substrate further has a third region spaced apart from said first region, and said second surface of said dielectric substrate further has a fourth region spaced apart from said second region and overlapping with a projection of said third region onto said second surface, said circuit board further including a proximity sensing electrode formed on said third region of said first surface, and an auxiliary proximity sensing electrode formed on said fourth region of said second surface and coupled to said proximity sensing electrode.

16. The touch sensing system as claimed in claim 15, further comprising at least one light emitting diode disposed on said circuit board, said sensed signal processing unit including at least one light control port coupled to said light emitting diode, and controlling light emission of said light emitting diode according to capacitance variation sensed by said touch sensor unit.

* * * * *